US011294378B2

(12) United States Patent
Ilardi et al.

(10) Patent No.: US 11,294,378 B2
(45) Date of Patent: Apr. 5, 2022

(54) PARK ATTRACTION WITH COLLABORATIVE PASSENGER CONTROL OF HOLONOMIC VEHICLES

(71) Applicant: DISNEY ENTERPRISES, INC., Burbank, CA (US)

(72) Inventors: Michael J. Ilardi, Los Angeles, CA (US); Frank D. Mezzatesta, III, Glendale, CA (US); Jonathan Michael Becker, North Hollywood, CA (US); Dawson McLeod Dill, Pasadena, CA (US); Luke Andrew Sciaraffa, Glendale, CA (US); Joseph George Hager, IV, Valencia, CA (US); William Bennett Hogue, Jr., Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 776 days.

(21) Appl. No.: 15/940,390

(22) Filed: Mar. 29, 2018

(65) Prior Publication Data

US 2019/0302776 A1 Oct. 3, 2019

(51) Int. Cl.
*G05D 1/02* (2020.01)
*B60N 2/01* (2006.01)
(Continued)

(52) U.S. Cl.
CPC .......... *G05D 1/0212* (2013.01); *A63G 25/00* (2013.01); *A63G 31/02* (2013.01); *A63G 33/00* (2013.01);
(Continued)

(58) Field of Classification Search
CPC .... G05D 1/0212; B60W 50/10; B60W 10/20; A63G 33/00; A63G 31/02; A63G 25/00;
(Continued)

(56) References Cited

U.S. PATENT DOCUMENTS

| 4,733,737 A | 3/1988 | Falamak |
| 5,374,879 A * | 12/1994 | Pin .......................... B25J 5/007 180/21 |

(Continued)

FOREIGN PATENT DOCUMENTS

CN 202942637 U 5/2013

OTHER PUBLICATIONS

Extended European Search Report, Application No. 19154933.6, dated Jul. 25, 2019.
(Continued)

*Primary Examiner* — Dale W Hilgendorf
(74) *Attorney, Agent, or Firm* — Snell & Wilmer L.L.P.; Kent A. Lembke (57) ABSTRACT

A system for use in a park attraction to provide collaborative driving experiences. The system includes a vehicle including a body with passenger seats, including a user input assembly proximate to each of the passenger seats, and further including a holonomic drive system adapted to move the body in any direction while riding on a driving surface of the park attraction. The system also includes a system controller (running an attraction/game control module) that operates to: (a) receive user input from each of the user input assemblies; (b) process the user input from each of the user input assemblies to generate a control vector associated with each of the user input assemblies; (c) combine the control vectors from all of the user input assemblies to generate a resultant vector; (d) generate a drive control signal from the resultant vector; and (e) transmit the drive control signal to the vehicle.

23 Claims, 5 Drawing Sheets

(51) Int. Cl.
*B62D 15/00* (2006.01)
*A63G 25/00* (2006.01)
*A63G 31/02* (2006.01)
*A63G 33/00* (2006.01)
*B60W 50/10* (2012.01)
*A63G 31/00* (2006.01)
*G08G 1/16* (2006.01)

(52) U.S. Cl.
CPC .............. *B60N 2/01* (2013.01); *B60W 50/10* (2013.01); *B62D 15/00* (2013.01); *A63G 31/00* (2013.01); *G08G 1/166* (2013.01)

(58) Field of Classification Search
CPC .......... A63G 31/00; B62D 15/00; B60N 2/01; G08G 1/166
See application file for complete search history.

(56) References Cited

U.S. PATENT DOCUMENTS

| | | | |
|---|---|---|---|
| 6,796,908 B2* | 9/2004 | Weston | A63G 7/00 434/55 |
| 7,730,978 B2 | 6/2010 | Dixon | |
| 7,739,006 B2 | 6/2010 | Gillula | |
| 9,004,202 B2 | 4/2015 | Riwan et al. | |
| 9,011,197 B2 | 4/2015 | Smoot et al. | |
| 9,085,302 B2 | 7/2015 | Borroni-Bird et al. | |
| 9,216,745 B2* | 12/2015 | Beardsley | G05D 1/0289 |
| 9,542,011 B2 | 1/2017 | Huang et al. | |
| 9,573,416 B1* | 2/2017 | Niemeyer | B60B 19/003 |
| 9,610,511 B1* | 4/2017 | Francis | A63G 31/16 |
| 9,889,860 B2* | 2/2018 | Osterman | A63G 7/00 |
| 10,293,837 B2* | 5/2019 | Osterman | B60W 50/14 |
| 10,369,483 B1* | 8/2019 | Hall | A63G 31/02 |
| 2009/0125161 A1* | 5/2009 | Baur | G09B 19/16 701/1 |
| 2009/0298589 A1* | 12/2009 | Van der Burgt | A63G 33/00 463/36 |
| 2011/0010618 A1* | 1/2011 | Crawford | G06F 3/016 715/702 |
| 2013/0144468 A1 | 6/2013 | Foster et al. | |
| 2017/0166221 A1* | 6/2017 | Osterman | B60W 50/14 |
| 2018/0170399 A1* | 6/2018 | Osterman | A63G 31/16 |
| 2019/0351342 A1* | 11/2019 | Hall | A63G 31/00 |

OTHER PUBLICATIONS

Saleh, Louay, "Shared Steering Control Between a Driver and an Automation: Stability in the Presence of Driver Behavior Uncertainty," IEEE Transactions on Intelligent Transportation Systems, vol. 14, No. 2, Jun. 2013.

Arthur Levine, "Special to USA Today, IAAPA Expo Unveils Wild New Rides," Dec. 5, 2017, www.usatoday.com/story/travel/experience/america/theme-parks/2017/12/05/iaapa-expo-new-rides-attractions-2017/920847001.

* cited by examiner

PARK ATTRACTION WITH COLLABORATIVE PASSENGER CONTROL OF HOLONOMIC VEHICLES

BACKGROUND

1. Field of the Description

The present description relates, in general, to amusement and theme park rides or attractions with vehicles that have their movements controlled, at least in part, by the vehicle occupants or passengers. More particularly, the present description relates to an attraction, which may be implemented at an amusement or theme park or other entertainment facility, that includes one-to-many holonomic vehicles, which are each configured to have operations (e.g., vehicle movement defined by direction of travel and/or velocity) controlled in a collaborative manner by the vehicle's passengers.

2. Relevant Background

Amusement and theme parks are popular worldwide with hundreds of millions of people visiting the parks each year. Park operators continuously seek new designs for attractions and rides that attract and entertain park visitors in new ways to encourage more and more people to visit their parks and to provide unique experiences that differ from those available at other parks.

Recently, there has been an increasing demand for rides that allow the participants to interact. In some rides, passengers in a vehicle can operate devices in their vehicles to interact with objects outside the vehicle such as to collect points as the vehicle moves along a fixed ride path. In other rides, the ride path is generally fixed or constrained, but passengers can provide input to operate the vehicle such as to spin or to move up and down with a predefined range. In each of these cases, though, there is typically no collaboration among the riders or passengers. In the first examples, each passenger is competing with the other passengers to score more points, and operation of the vehicles is often not affected by the user input. In the latter examples of rides, only one input device is provided such that the passengers have to share this input device or take turns controlling vehicle operations.

Hence, there remains a need for a new attraction (or ride as these terms may be used interchangeably herein) that allows or even forces passengers of a vehicle to collaborate to effectively or successfully control operations of their vehicle. In some preferred examples, it may be useful for the attraction to be designed to require collaboration of the vehicle passengers to maneuver a vehicle in a particular ride or attraction space to participate in a game, to achieve a particular goal for a play space, to move along a ride path while avoiding obstacles and other vehicles, or the like.

SUMMARY

Briefly, the inventors recognized that it may be useful to create a new theme or amusement park attraction (or ride) that is built upon collaborative control of a ride vehicle carrying two or more (and, often, four or more) passengers. With this goal in mind, the inventors determined that the ride vehicle could take the form of a holonomic vehicle, which can move in any direction upon a support surface and which may take the form of an omni wheel vehicle (such as a vehicle with the wheel assembly taught in U.S. Pat. No. 9,573,416, which is incorporated herein in its entirety by reference) or nearly any passenger vehicle with a holonomic drive system. As a design criteria, it was also decided that all of the passengers would be able to simultaneously drive the holonomic vehicle (e.g., have collaborative control over the vehicle's movements) in a particular drive space in a way that facilitates collaborative gameplay for a unique entertainment experience.

In the new attraction/ride system, the vehicle was configured to provide each passenger with a user input assembly (e.g., a control button, slider, joystick, a power/fuel display, and the like) that when operated by the passenger allows them to each provide user input, which may impart a virtual force along a distinct vector (e.g., a "thrust" or motive force in a particular direction associated with that user input assembly (and passenger operating the assembly)). Each of the vectors (defining direction of motive force or thrust) may be angularly offset from each other such as by ninety degrees when there are four user input assemblies and passengers in a holonomic vehicle. A system controller, which may be provided offboard, processes the one-to-four (or more) user inputs to generate a control signal that is transmitted to the local controller on the vehicle that operates the vehicle's drive system to move in a particular direction at a particular speed. In one embodiment, a summation of the forces associated with the user inputs creates a control signal that produces the vehicle's velocity (i.e., defines vehicle's direction and speed).

The design of the attraction/ride system provides a vehicle drive or control method with a number of beneficial or desirable features. First, the drive method implements discrete controls for each user/passenger of the vehicle. For example, each passenger may only control a single vector of motion and cannot drive the whole vehicle themselves as their input can only result in movement of the vehicle in one direction (e.g., in the direction their seat is facing). Second, an identical control scheme is provided for each user with matching user input assemblies such as providing each passenger with one input element (e.g., a button, a slider, a switch, an icon on a touchscreen, a joystick, or the like) that turns their virtual thruster or drive portion on or off (with some embodiments adjusting the amount of thrust or motive force provided when "on" based on a power or fuel level assigned to each passenger that may vary based on some sensed parameter such as time the virtual thruster or drive portion has been on, whether a power/fuel (or a "power up") object has been collected by the vehicle such as by causing the vehicle to collide with or pass over a real or virtual object in the drive space of the attraction). Third, the drive method may provide equally distributed collaboration such as with each person having the same degree of influence on the resultant velocity of the vehicle (with velocity being defined by vehicle direction and speed). Fourth, the drive method provides an intuitive (to the passengers) way to distribute driving ability without having to take turns on a park attraction or ride.

More particularly, a system is provided for use in a park attraction that provides a collaborative driving experience. The system includes a vehicle including a body with a plurality of passenger seats, including a user input assembly proximate to each of the passenger seats, and further including a holonomic drive system adapted to move the body in any direction while riding on a driving surface of the park attraction. The system also includes a system controller (running an attraction/game control module) that operates to: (a) receive user input from each of the user input assemblies; (b) process the user input from each of the user input assemblies to generate a control vector associated with each of the user input assemblies; (c) combine the control vectors from all of the user input assemblies to generate a resultant vector; (d) generate a drive control signal from the resultant vector; and (e) transmit the drive control signal to the vehicle. The holonomic drive system operates in response to the drive control signal to move on the driving surface of the park attraction.

In some system implementations, the control vectors each define a direction of travel on the driving surface and a magnitude of acceleration. In such cases, the vehicle body may include four of the passenger seats, and the direction of travel for a pair of adjacent ones of the user input assemblies may be offset at an angular offset of 90 degrees. Further, in such implementations, the passenger seats may have seat backs oriented to face inward toward a vertical center axis of the body of the vehicle (e.g., so a passenger in such seats would also face inward). The direction of travel for each of the control vectors can be orthogonal to a vertical plane extending through one of the seat backs and extends inward toward the vertical center axis of the body of the vehicle, whereby the direction of travel is in a direction corresponding to a direction a passenger in one of the passenger seats is facing.

In some embodiments of the system, a fuel or power level value is assigned to each of the user assemblies. Then, the processing of the user input from each of the user input assemblies includes multiplying the magnitude of acceleration by the fuel or power level value. In such embodiments, the fuel or power level value can be decreased based on length of time in which a corresponding one of the user input assemblies is operated to provide input and can also be increased based on length of time in which the corresponding one of the user input assemblies is not operated. In general, the system controller may implement an algorithm for processing the user inputs, and this algorithm may combine the control vectors using 2D vector math (e.g., 2D vector summation).

In the same or other cases, each of the user input assemblies includes a drive control element that is operable by a passenger of the vehicle to be in a first operating state and in a second operating state. The user input provided when the drive control element is in the first operating state corresponds with full thrust by a virtual thruster or drive associated with and operable by the passenger to move the vehicle in a direction matching a direction in which the passenger is presently facing in one of the passenger seats. In these or other implementations of the system, the system controller, before generating the drive control signal, can be adapted to modify the resultant vector based upon operating parameters of the vehicle, based upon game play data for the park attraction, or based on detection of an upcoming collision with an obstacle or other vehicle. In one exemplary system, the holonomic drive system takes the form of an omni wheel-based drive.

DETAILED DESCRIPTION

The following description is directed toward a collaborative drive system (and corresponding method) for a passenger vehicle, which can be used along with other such vehicles to provide a ride or attraction in a theme or amusement park or other entertainment facility. The passenger vehicle generally includes passenger seating (intended generally to mean any passenger-locating support) that orients each of two or more passengers in a particular direction, and the passenger vehicle also includes a holonomic drive such that it can operate to move in any direction (i.e., in any X-Y coordinate) on a surface of a drive space. The attraction or ride system includes a control system that generates control or drive signals to each vehicle's holonomic drive system to move with a velocity (i.e., direction and speed) based on processing of user input from all passengers of the vehicle to provide collaborative driving of the vehicle about the drive space.

To this end, a user input assembly is provided for each of the passengers to allow them to selectively provide user input to operate their virtual drive or thruster to attempt to move the vehicle in a direction corresponding with a drive vector associated with their user input assembly, and this drive vector may be linear and in a predefined direction, e.g., direction in which the passenger is facing or is oriented (e.g., same direction as their seat or support on the vehicle body) such as all facing inward toward each other (or outward away from each other) at 90-degree offsets when the vehicle is a four-passenger vehicle. The control system may sum all the inputs to calculate the resultant velocity for use in generating the drive system control signal for the vehicle, with all inputs being treated equally, with each input being multiplied by a game factor/parameter (such as fuel/power level of the passenger), and/or with each input or the vehicle's input affected by game data for the vehicle (such as reduced or increased speed based on points or fuel/power collected for the vehicle, current location in the drive space of the vehicle, and so on).

Figure 1:
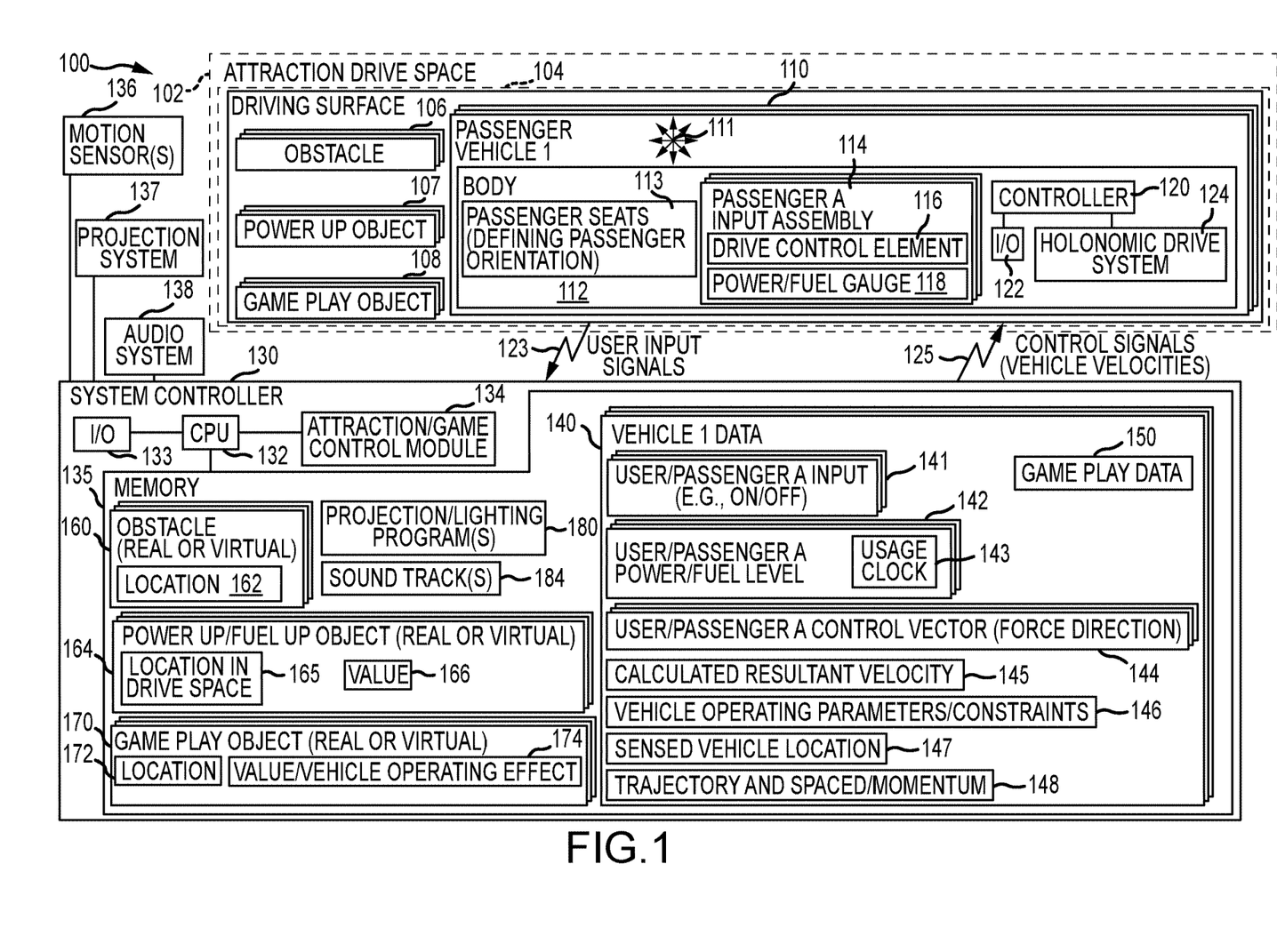
FIG. 1 is a schematic or functional block drawing of an attraction or ride system adapted to provide passengers of a vehicle with collaborative control or driving of the vehicle in a ride or attraction drive space.

FIG. 1 illustrates a functional block diagram of a ride or attraction system 100 useful for implementing the collaborative driving method of the present description. The system 100 includes an attraction drive space 102 with a drive surface 104 such as a planar platform. In the drive space 102, obstacles 106 may be physical (or "real") objects such as outer sidewalls along the periphery of the surface 104, thematic props, and the like and/or may be virtual objects that are displayed in the space 102 and/or on surface 104 such as with projection system 137 of the system 100. During operations of system 100 or game play, participants or vehicle passengers (not shown in FIG. 1 but positioned in vehicles 110) are instructed to avoid the obstacles 106. Power up (or fuel up) objects 107, which may be real or virtual, may also be positioned at various locations in the space 102 such as on the driving surface 104, and the passengers may be instructed to move their vehicles 110 over or near these objects to gain power/fuel for driving their vehicle 110. Further, game play objects 108, which again may be real or virtual, may be provided in the drive space 102 such as on the driving surface 104, and, again, the passengers may be instructed to move/drive their vehicle 110 over or near these objects 108 to gain points, to modify operating parameters 146 of their vehicle 110, and otherwise participate in game play (with collected/contacted play objects 108 being tracked and stored in memory 135 as shown as game play data 150 associated with each vehicle 140).

The system 100 further includes one-to-many passenger vehicles 110 positioned in the attraction drive space 102 on the driving surface 104. Each vehicle 110 includes a body 112 with two or more passenger seats 113 (i.e., any type of passenger support component may be considered a "seat"), which may define which way each passenger faces or is oriented when positioned in the body 112. In some examples, each passenger sits facing inward toward the center of the body 112 while in other cases the passengers face outward away from the center of the body 112 or all face the same direction with passengers in one, two, or more rows.

An input assembly 114 is provided on the body 112 for each passenger such as directly in front of their seat 113 within easy reach by the passenger when they are seated in the vehicle 110. The user input assembly 114 is adapted to allow all of the users/passengers to concurrently and selectively provide input (which may include no input) to collaboratively drive or control movement of the vehicle 110 in any direction on surface 104 as shown with arrows 111. To this end, the assembly 114 may include a drive control element 116 to turn a virtual thruster (or engine, motor, or other drive) on or off to provide a motive force to move the vehicle 110 in a direction along a drive vector associated with that passenger's user input assembly. For example, the drive vector may define a linear path extending in the direction that the passenger is facing (or a vector that is positive and orthogonal to a plane extending through the passenger's seat 113, i.e., through the seat back). An angular offset typically is provided between adjacent pairs of the passenger's drive vectors such as a 90 degree offset when four passenger seats 113 and four passenger user input assemblies 114 are provided in the vehicle body 112. The user input assembly 114 may include a power/fuel gauge 118 displaying a level or amount of power/fuel that the passenger using the assembly 114 has available at the current time to operate their virtual thruster with the drive control element 116 (as explained in more detail below for embodiments in which a passenger's power varies based on past game play). In practice, the drive control element 116 may take many forms such as a button, a switch, a slider, a joystick, a touchscreen, and the like and may allow the user to indicate whether their virtual thruster/drive is on or off or to set other parameters (such as direction of their drive vector when not fixed, level/amount of thrust as some fractional value of presently available maximum thrust/motive force, and the like).

Each vehicle 110 further includes a local controller 120 (e.g., hardware and software components such as a processor executing code/programs to perform the functions described herein) that controls operations of a holonomic drive system 124, such as an omni wheel drive assembly, to move 111 the vehicle 110 in any direction as instructed by control signals 125 from the system controller 130 at a particular vehicle velocity (that defines direction in X-Y coordinates and at a particular speed). The vehicle 110 also include input/output devices 122 to allow it to receive the signals 125 in a wireless manner and to transmit signals 123 that provide user input data from the input assemblies 114 to the system controller 130 for processing to generate the drive control signals 125 (again via a wireless transceiver or the like).

The system 100 further includes a system controller 130 that is used to control operations of all of the passenger vehicles 110 via control signals 125 defining each vehicle's velocity on the driving surface 104. The system controller 130 includes a processor 132 that manages operations of I/O devices to receive user input signals 123 and to transmit control signals 125 to the vehicles 110. The system controller 130 uses the processor 132 to run/execute attraction/game control module 134 (e.g., a game program or routine) to provide the collaborative drive method described herein for each of the vehicles 110 including processing user input data in signals 123 to generate the control signals 125. The processor 132 also manages operations of (data storage to and retrieval from) memory (or data storage devices) 135.

As shown, a record/file 140 is provided in memory 135 to store data associated with each of the vehicles 110. Particularly, the vehicle data 140 includes user/passenger input 141 from each of the input assemblies 114, which may indicate whether or not the passenger is presently operating their drive control element 116 (e.g., to be "on" or "off" or to provide thrust/power with their virtual thruster/drive) and, in some cases, how they are operating the element (e.g., the element 116 may be designed to allow input between on and off similar to an accelerator in a standard automobile, the drive control element 116 may be a joystick or similar device allowing the passenger to set the direction of their drive vector, and the like).

In some embodiments, each passenger's virtual thruster will be assigned equal power or force magnitude, but, in other cases as shown, each passenger may be assigned a power/fuel level 142 that may change during operation of the vehicle 110 (during game play) such as based on amount of use of power/fuel as may be measured by a usage clock 143 (e.g., the level 142 will decrease with time the thruster/drive is "on" or operated based on the user input 141). The fuel/power level 142 may be defined as a percentage of full power/fuel and may be decreased linearly with usage time as measured by clock 143 (or may be modified or decreased in some other manner). It may be regenerated or refueled with lack of use, too (such as by no use for a predefined length of time or gradually as time passes) or may be quickly regenerated or refueled based on game play data 150 such as when the vehicle 110 passes over or collects a power up object 107 by moving the vehicle 110 to a location of one of the power up objects 107. The vehicle data 140 also stores for each passenger a control vector definition 144 that defines in which direction their force/drive vector is oriented (which way is directed relative to the center vertical axis of the vehicle), and, in a four-passenger embodiment, each adjacent pair of the force/drive vectors are offset by an angle of 90 degrees (with each passenger facing inward to the center of the vehicle body or outward away from the center and the vectors oriented in the direction the passengers are facing in their seats 113).

The attraction/game control module 134 processes (e.g., provides a summation of) the forces/thrusts requested by the set of passengers based on their inputs 141, their power/fuel levels 142, and their control vectors 144 to generate a calculated resultant velocity 145. Exemplary calculations by the module 134 are described in further detail below. The module 134 may then generate a control signal 125 for transmittal by the processor 132 via the I/O devices 133 to the controller 120 of each of the vehicles 110 for use in driving the holonomic drive system 124 (e.g., to move 111 at a defined vehicle velocity (i.e., in a particular direction and at a particular speed)).

The resultant velocity 145, however, may be further changed based on vehicle operating parameters/constraints such as preset maximum accelerations and speeds for the vehicle 110, limitations of the holonomic drive system 124, and so on. Additionally, the system 100 includes motion sensors 136 that are used to sense and/or determine the location 147 of the vehicle 110 and/or the trajectory and/or speed/momentum 148 of the vehicle 110, and the resultant velocity 145 may be modified by the control module 134 based on the sensed vehicle location 147. For example, the control module 134 may be designed to prevent collisions between two of the vehicles 110 and may halt two vehicles 110 determined to soon collide and reverse their travel direction (or otherwise modify one or both vehicle's velocity to avoid collision). The amount of "bounce" from the collision may be varied, too, by the control module 134 such as with the one with the greater speed/momentum 148 receiving the greater velocity off the virtual collision. The obstacles 160 may also include real or virtual objects such as thematic props, structural aspects of the space 102 such as walls, and the like that the vehicle 110 is to avoid and for which the controller 130 may prevent collision in some cases.

The location 147 is also used by the control module 134 to determine when the vehicle 110 has passed over (or near enough) a power up object 164 in the space 102 that has its location 165 and value 166 stored in memory 135 and/or a game play object 170 that also has its location 172 and value or vehicle operating effect 174. The control module 134 may use the value 166 to determine how much power/fuel to provide to the vehicle's passengers by changing their power/fuel levels 142. The control module may use the value/vehicle operating effect 174 for the game play objects collected by the vehicle 140 to assign points to the vehicle and/or to modify vehicle operations such as by increasing or decreasing its speed, by changing its direction of travel, by causing it to spin about its center axis, by causing it to vibrate or shake, and so on.

The control module 134 may take the form of a game controller that operates a projection system 137 and an audio system 138 in or near the drive space 102 to enhance the game play during operations of the system 100 based on stored projection/lighting programs 180 and soundtracks 184, respectively. For example, the projection/lighting programs 180 may include one or more of virtual obstacles 106, power up objects 107, and game play objects 108 that are displayed in the space 102 (e.g., on the driving surface) and the audio system 138 may play the soundtracks 184 to encourage the passengers of vehicles 110 to move their vehicle relative to these displayed game components and to react when the vehicle 110 collides (virtually) with an obstacle 106 (or another vehicle 110) or collects an object 107 or 108. As another example, the projection system 137 may be used via the projection/lighting programs 180 to illuminate a portion of the driving surface 104 proximate to the vehicle 110 whenever a passenger turns their virtual thruster/drive on (such as to simulate flames being emitted out of the side of the vehicle body 112) or to show the direction of the resultant velocity 145 for the vehicle 110.

Figure 2:
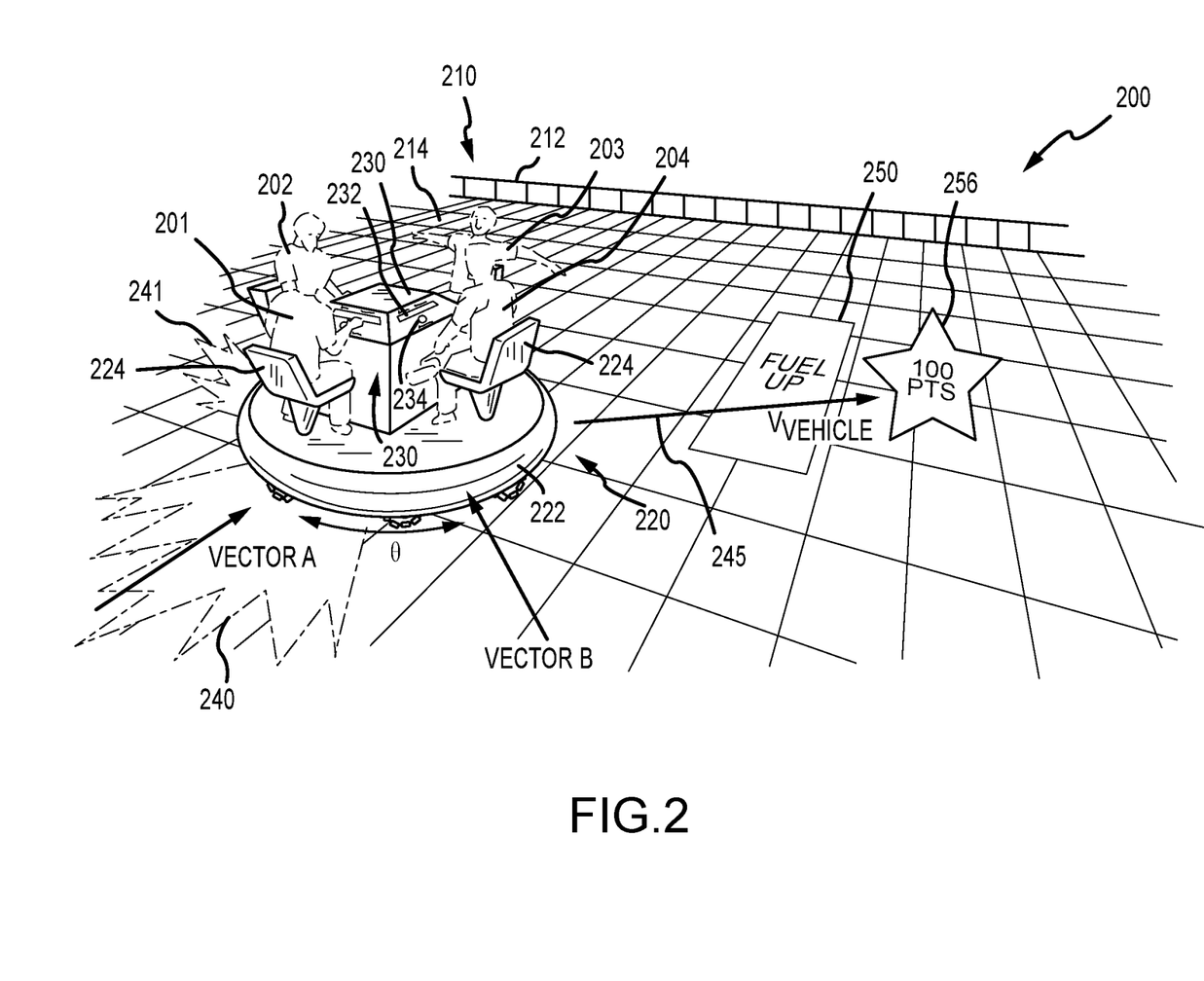
FIG. 2 is a partial top perspective view of an attraction or ride system during use showing four passengers of a vehicle collaborating to drive their vehicle in a ride space.

FIG. 2 is a partial top perspective view of an attraction or ride system 200 (e.g., a physical implementation of the system 100 of FIG. 1) during its use to provide a new entertainment experience. Particularly, during use or operations of the system 200, four passengers 201, 202, 203, and 204 of a vehicle 220 are able to collaboratively drive the vehicle 220 in a ride space 210. The system 200 includes a ride or drive space 210 enclosed by an outer sidewall 212 (which may be an obstacle as discussed above that a system controller (not shown but discussed above with reference to FIG. 1) controls the vehicle 220 to avoid contact with when issuing drive control signals to the vehicle 220). The ride space 210 also includes a drive surface or floor 214 supporting the vehicle 220 and providing a projection surface for displayed virtual objects including a fuel up object 250 and a game play object 256 that may be projected by a projection system (not shown but discussed with reference to FIG. 1) operated by the system controller to provide game objects for the vehicle 220 to "collect" by passing over or near as it is moved via collaborative driving by the passengers 201-204.

The vehicle 220 includes a body 222 that is driven by a holonomic drive system (not shown but understood from FIG. 1) such as an omni wheel drive operating in response to drive control signals from a system controller to move in two dimensions on surface 214. As shown with arrow 245, the vehicle 220 is moving with a resultant velocity, $V_{Vehicle}$, calculated by the system controller by processing user input concurrently provided by one or more of the four passengers 201-204 in the vehicle 220. The resultant velocity, $V_{Vehicle}$, defines both the current direction and speed of the vehicle 220. As shown, the body 222 includes four passenger seats 224 in which the passengers 201-204 are positioned and oriented to face inward toward the center vertical axis of the body 222 or toward a centrally positioned dashboard 230 of the vehicle 220.

To facilitate collaborative driving, the vehicle 220 includes a user input assembly 230 for each of the four passengers 201-204. The assembly 230 is provided in/on the body 222 with the embodiment shown including a drive control element in the form of a thrust/accelerate button 234 and a power/fuel gauge 232 (e.g., a bar illuminated by LEDs, a gauge in a display screen, or the like). The gauge 232 is operated to display a level of fuel/power (e.g., percentage or fraction of maximum or full power/fuel) that is presently available to the passenger 201, 202, 203, or 204 in the seat 224 proximate to and facing the particular user input assembly 230.

The thrust/accelerate button 234 is operable (by pressing or not pressing so fully "on" or "off" in this embodiment) by the passenger 201, 202, 203, or 204 in the adjacent and proximate seat 224 to activate a virtual thruster/drive to provide user input that can be processed by the system controller (and its attraction/game control module) to generate the resultant velocity, VVehicle, via operating the holonomic drive system of the vehicle 220. As shown, the drive or thrust assigned to each passenger's virtual thruster/drive by the system controller is provided as a vector as shown with Vectors A and B that are orthogonal to a plane containing the backs of seats 224 and in a direction a passenger in those seats 224 would be facing (e.g., thrust moves vehicle 220 in direction each passenger 201-204 is facing if taken in isolation without other thrusts being applied). Each pair of adjacent drive or thrust vectors, such as Vectors A and B, are offset from each other by an angular offset, $\theta$, that for a vehicle with four passengers 201-204 as shown typically will be ninety degrees. When a different number of passenger seats 224 and input assemblies 230 are used in a vehicle, the angular offset between drive/thrust vectors may differ such as 120 degrees when three passenger seats 224 are provided, 60 degrees when six passenger seats 224 are provided, and so on.

In this example, passengers 201 and 202 are the only passengers operating or pressing their thrust/accelerate buttons 234. The summation of their user inputs (e.g., thrust vectors which may be the velocity multiplied by the fuel/power level presently assigned and available to each of these passengers (or their user input assembly)) provides the resultant velocity, $V_{Vehicle}$, that is provided by operation of the holonomic drive system by the system controller. As can be seen, the resultant velocity, $V_{Vehicle}$, has a direction that generally is between and away from the two passengers 201 and 202 (e.g., in the direction these two are facing but differing from either of their drive/thrust vector directions considered alone). The system controller also concurrently operates a projection system (not shown) to project images (e.g., video) 240 and 241 onto the ride surface 214 adjacent and proximate to the vehicle body 222 behind the seats 224 of passengers 201, 202 when they are pressing their thrust/accelerate buttons 234 to provide visual feedback to the other passengers (e.g., passengers 203 and 204) of who in the group is presently trying to drive the vehicle 220.

Collaborative driving is used to try to pass over the fuel up object 250 so that fuel/power can be added to one or more of the passengers 201-204 fuel store/level. In some embodiments, the fuel up object 250 may instead be a physical or real object (such as shown for object 160 in FIG. 1), and the vehicle 220 collects or is given power-ups (e.g., a boost or an acceleration) or increases their fuel store/level by touching or bumping into the object 250, with the object 250, vehicle 220, or system controller acting to detect/sense the touching or collision and to respond by boosting power and/or increasing fuel/power levels (or in storage). Collaborative driving is also used to pass over game play object 256 to obtain points or otherwise to progress in the game being played during operations of the system 200. In other embodiments, game play objects may be displayed on the surface 214 that when "collected" by the vehicle 220 cause the system controller to modify operations of the vehicle 220 such as by slowing or speeding it up by operating the holonomic drive system, by causing the vehicle 220 to turn or change direction or to spin in place or while traveling, by causing it to shake or shutter, and/or the like.

FIGS. 3A-3D are schematic or diagrammatic illustrations of a holonomic vehicle 300A-300D that is being operated in four states according to the collaborative driving method described herein (e.g., by implementation of the system 100 of FIG. 1). With reference to a first operating state shown in FIG. 3A, the holonomic vehicle 300A is shown at a point in time when no passenger input is being provided such as during initial loading of the vehicle 300A and prior to initiation of game play. The vehicle 300A may have a similar configuration as vehicle 220 of FIG. 2 with seating for four passengers 310A so that the passengers 310A all face inward toward a center vertical axis of the vehicle 300A. Particularly, each passenger 300A faces a different direction due to the seating configuration, and a virtual thruster/drive is associated by a control system with each of the passengers 310A (or their user input assemblies (not shown but understood from FIGS. 1 and 2)) with drive/thrust vectors at an offset angle, θ, of ninety degrees between adjacent pairs of the passengers. In this way, each passenger faces a direction opposite one other of the passengers and faces a direction that is at a 90-degree offset, θ, from two other adjacent passengers 310A. The control or driving of the vehicle 300A is collaborative in that each passenger can only drive the vehicle 300A in one direction (along their drive vector's direction), and it may also be shared with the system controller (not shown but understood from FIG. 1) that may drive the vehicle 300A without user input or modify the input (e.g., to avoid collisions with other vehicles and other obstacles, to suit a particular ride or game play program (e.g., to guide the vehicle along a ride path with some freedom of movement provided based upon user input), and the like).

Figure 3A:
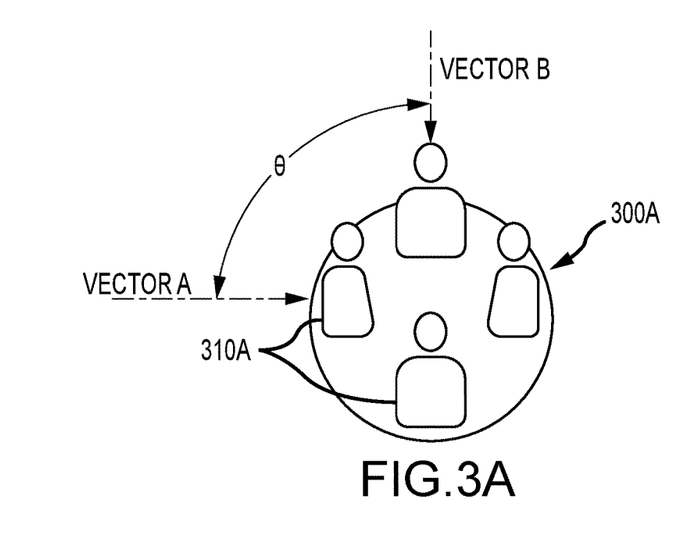
FIGS. 3A-3D are schematic or diagrammatic illustrations of a holonomic vehicle operating in four states according to the collaborative driving method described herein (e.g., by implementation of the system of FIG. 1)
Figure 3B:
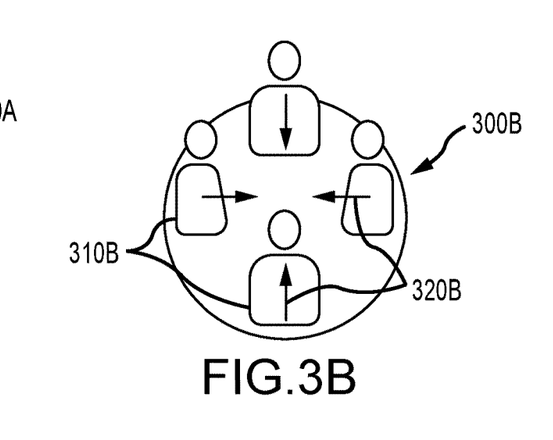

In the operating state shown in FIG. 3B, it can be seen that each passenger 310B of the vehicle can operate their user input assembly to impart thrust or a force with their virtual thruster/drive such as by pressing on a button or other drive control element. In some embodiments, the virtual force is imparted on the vehicle 300B in the direction the passengers are facing (e.g., orthogonally outward from a plane passing through their seatback toward the center of the vehicle 300B). The magnitudes or amounts of thrust/force may be equal such as throughout game play or when all have equal fuel/power levels assigned to them (or their user input assembly or seat in the vehicle 300B). When all press their thrust/accelerator button and the magnitudes of the thrusts are equal (as shown with arrows 320B), the resultant velocity is zero as inputs from oppositely positioned passengers (passengers facing each other) cancel out (or sum to zero). Hence, collaborative driving is needed to move the vehicle in a desired direction.

Figure 3C:
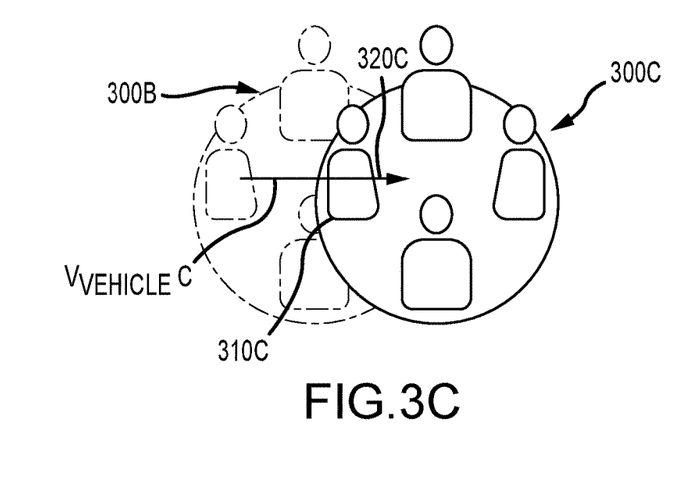

For example, in the operating state of FIG. 3C, it can be seen (with arrow 320C) that a single passenger 310C is providing user input by pressing on their thrust/accelerator button. The system controller may process this user input to generate a resultant velocity, $V_{VehicleC}$, that is used to generate and transmit a control signal to the holonomic drive system of the vehicle 300C that operates to move the vehicle 300C along a single vector. The movement may be based solely on the input (e.g., speed and direction defined by user input including, in some embodiments, the amount of fuel/power the passenger has presently available) or may be based on this input with modifications such as to avoid collisions or based on game play data assigned to the vehicle 300C (e.g., has the vehicle collected game play objects that affect vehicle operations such as to multiply acceleration, to cause spinning or turning, and so on). The other three passengers are collaborating in a manner by not providing any user input that may cancel or change the travel of the vehicle 300C (e.g., it may desirable in the operating state of FIG. 3C to move the vehicle 300C in the direction that the passenger 310C is facing).

In the later operating state of FIG. 3D, two passengers 310D are providing user input by pressing their thrust/accelerate buttons of their user input assemblies. As shown, the system controller processes the user input (thrust direction and magnitude as shown with arrows 320D) such as via summation to generate a control signal to cause the holonomic drive system of the vehicle 300D to move the vehicle 300D with a resultant velocity, $V_{VehicleD}$ (with or without modification based on vehicle operating parameters and/or game play data associated with the vehicle 300D). In this manner, multiple passengers collaborate to drive the vehicle 300C and 300D to specific destinations and in certain directions (and at certain speeds).

As discussed above, the user input assembly may be implemented with a number of configurations to allow users/passengers to provide input regarding their portion of the collaborative control. The direction and magnitude of each input (or the drive vector) may be varied to practice the collaborative drive systems and method described herein (e.g., vector may have a direction matching the direction the passenger is facing or another direction may be used (e.g., with an input control element that is a joystick or the like) and passenger seats may define which direction each passenger is facing such as inward, outward, all one direction, and so on). Further, the attraction or game control module may utilize one or more different algorithms to process the user inputs to generate a control signal to transmit to the vehicle's local controller to control the onboard holonomic drive system.

Figure 4:
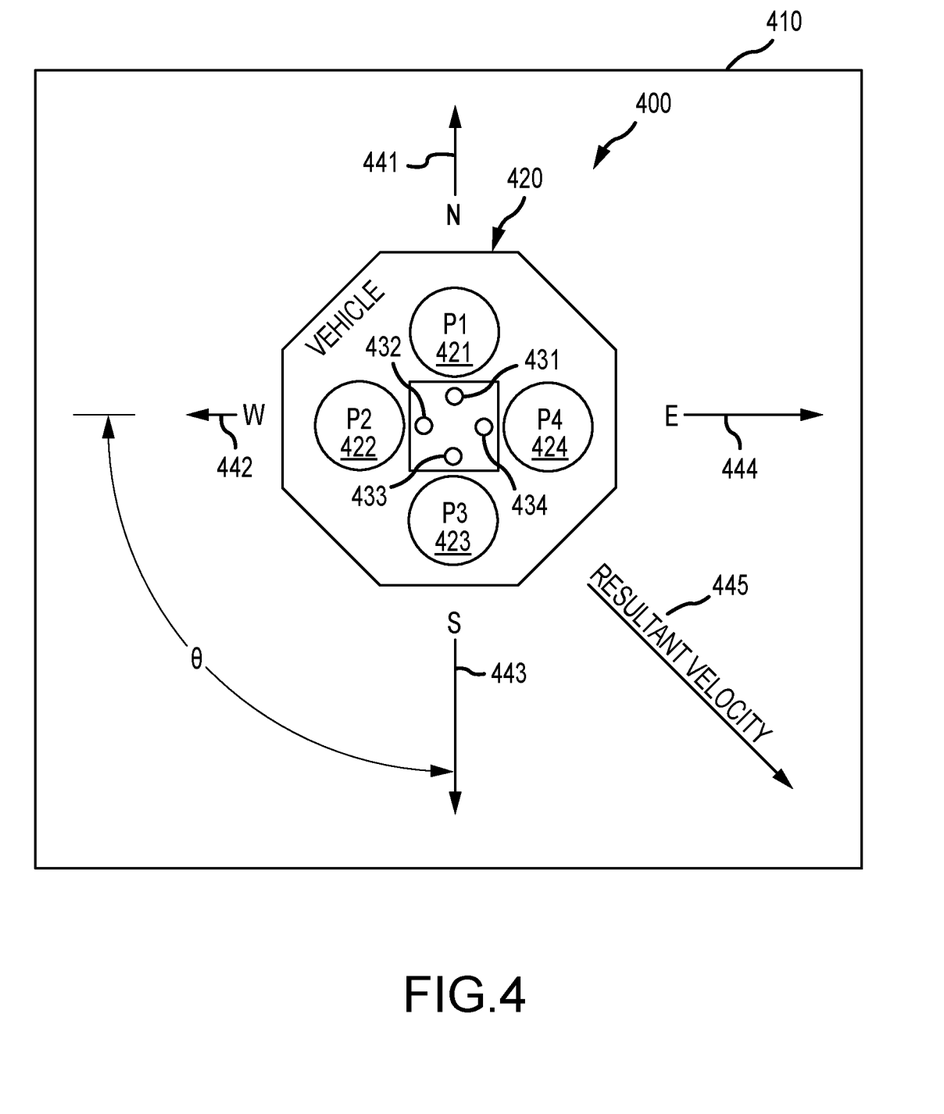
FIG. 4 is a top schematic view of an attraction or ride system showing one vehicle for ease of illustration and results of processing of user input by a system controller to operate a holonomic vehicle to have a resultant velocity on a ride surface (or on a surface in a ride space)

The following describes one useful algorithm that can be implemented by the control module to generate vehicle drive control signals based on user inputs from passengers of a holonomic vehicle with reference to FIG. 4. In the following discussion, the term "vector" is used in the context of a 2-dimensional space (e.g., a floor of a ride/drive space of an attraction) to be defined by a combination of a direction and a magnitude, and the term "magnitude," to the extent of the effect specified by the vector, depends on what the vector represents, e.g., a velocity vector with a high magnitude will represent a fast speed in a given direction and with a lower magnitude a slower speed.

In one embodiment, the user input processing algorithm is run by the system controller processor frequently, such as multiple times per second. Each time the algorithm is run, it checks the state of every passenger's button (or other drive control element) at that instant. For each passenger who is pressing their button, the algorithm calculates an acceleration or thrust vector for them with the direction being the direction that the passenger's seat is facing and the magnitude being calculated by the following formula: (fuel gauge percentage for that passenger)×(configurable acceleration parameter). By using 2-dimensional vector math, the algorithm consolidates, by vector addition, all of the passengers' acceleration/thrust vectors to arrive at a single overall vector for the acceleration/thrust vector for the vehicle. This is the direction and magnitude that the vehicle will be accelerating at this instant purely based on the passenger input (which can then further be modified by the system controller based on game play data, vehicle operating parameters, and other factors set to achieve a desired entertainment experience).

The system controller and its attraction/game control module may limit the amount of control over vehicle operations provided to or shared with the passengers of a vehicle. The following is an exemplary set of other attraction or vehicle parameters that may be taken into account to set the acceleration or thrust vector (or, in some cases, a resultant velocity as discussed above with reference to FIGS. 1-3D), which is used to control the holonomic drive system of a vehicle to provide shared collaborative control: (a) abiding by the vehicle's maximum linear speed; (b) abiding by the vehicle's maximum linear acceleration; (c) abiding by the vehicle's maximum linear deceleration; (d) abiding by the vehicle's maximum angular speed; (e) abiding by the vehicle's maximum angular acceleration; (f) abiding by the vehicle's maximum angular deceleration; (g) presence of physical moving objects in the vehicle's path; (h) presence of physical unmoving objects in the vehicle's path; (i) presence of virtual moving objects in the vehicle's path; (j) presence of virtual unmoving objects in the vehicle's path; (k) presence of other virtual objects, such as a virtual flowing river that carries the vehicle along its flow path; and (l) effects of simulated bounces/repels, such as when two vehicles engage in a software-guided "collision" (e.g., algorithms/software will slow both vehicles before they ever actually physically touch and will then spend some brief amount of time after the virtual collision repelling them away from each other during which time player inputs have no or a diminished effect).

Turning now to the specific example of FIG. 4, a top view is provided of an attraction/ride system 400 with a holonomic vehicle 420 driving upon a support surface or floor 410 of the system's ride/drive space. The vehicle 420 has a body with seating similar to that shown in FIG. 2 with four passengers 421, 422, 423, 424 each facing differing directions (i.e., inward to center of vehicle body). A user input assembly with a thrust/accelerate button 431, 432, 433, 434 is provided in a console or dashboard in front of each passenger's seat within easy reach of the passengers 421, 422, 423, 424. A direction is assigned to the input (or generated thrust/acceleration vector) of each passenger, and these are offset by an angular offset, θ, of 90 degrees (as shown between the vectors 442, 443 for adjacent passengers 421 and 424). The arrows 441, 442, 443, 444 can be thought of as the acceleration/thrust vectors for passengers 421, 422, 423, and 424, respectively, or, more simply, as directions of vehicle travel by the collaborating passengers, while arrow 445 may be thought of as the resultant acceleration (or velocity) vector 445 generated by the algorithm processing the user inputs (or, more simply, the resulting direction of vehicle travel after processing of the user input by the control module and the algorithm it implements).

As shown, the vehicle 420 includes four seated passengers 421, 422, 423, and 424 in seats designed to cause or orient the passengers 421, 422, 423, and 424 to face inward. The passengers 421, 422, 423, and 424 may be labeled or identified as south (S), east (E), north (N), and west (W), respectively, after the four cardinal directions named by the direction that the vehicle will be thrusted/accelerated by their virtual thruster/drive when they each press/hold their thrust/accelerate button (which corresponds, in this non-limiting example, with the direction they are facing in the vehicle 420). In other cases, though, the passengers 421, 422, 423, and 424 may simply be numbered (1, 2, 3, and 4 or the like) or otherwise identified (A, B, C, and D or the like) to avoid any confusion or false understanding that the vehicle is always geomagnetically aligned in the space, which was used for one way of explaining input processing and responsive collaborative control. Note, two common ways of diagramming a holonomic vehicle, such as vehicle 420, with collaborative control are exact opposites (either with arrows showing direction that thrusters blast or showing direction that thrusters cause the vehicle to move).

In the example illustrated in FIG. 4, the following inputs are being received/determined by the system controller for processing by the control module algorithm: (a) the N passenger 423 has a fuel/power level of 90 percent and is not pressing/holding their thrust/accelerate button 433; (b) the S passenger 421 has a fuel/power level of 100 percent and is pressing/holding their thrust/accelerate button 431; (c) the E player 422 has a fuel/power level of 80 percent and is holding/pressing their thrust/accelerate button 432; and (d) the W player 424 has a fuel/power level of 10 percent and is presently holding/pressing their thrust/accelerate button 434. As a passenger holds their button, their fuel is depleted by the algorithm, and, conversely, when a passenger is not holding/pressing their button, the algorithm acts to replenish their fuel/power level. For example, each player may spend all their fuel in some predefined time period (such as in the range of 5 to 20 seconds with 8 seconds used in one prototype of the algorithm) and may be refueled/replenished in the same or some other predefined time period (e.g., refueling may be slower than expenditure of fuel or may be quicker or may be instantaneous when the vehicle collects a fuel up object on the ride surface/floor).

In the present example, it may be assumed that the acceleration parameter for the vehicle is set a particular value (which may be fixed for the ride/game or may vary over time such as being increased or decreased when pass over a virtual object on the ride surface/floor). To provide one useful example, the acceleration parameter can be set at 2 m/s². Then, the calculated passenger thrust magnitudes are: 0 for the N passenger 423 (who is not thrusting at this time); 100 percent*2 m/s²=2 m/s² for the S passenger 421; 80 percent*2 m/s²=1.6 m/s² for the E passenger 422; and 10 percent*2 m/s²=0.2 m/s² for the W passenger 424. The algorithm then implements 2D vector math to add all passenger thrust vectors together to obtain one overall resultant vector. When vectors disagree (are in opposite directions), they partially or completely cancel each other out by an amount dictated by their magnitudes and specific directions. Here, the algorithm arrives at a resultant vector with a south-east-ish direction (i.e., 34.9920 degrees, swept from south toward east) and a magnitude of 2.44131 m/s². This is the direction that the vehicle will be instructed by the system controller to be accelerating at this moment in time (ignoring, in this simplified example, the list of parameters/factors (as provided above) that the system controller may use to modify the resultant vector so as to only share control with the passengers of vehicle 420 in some cases or some operating states of the ride/attraction system 400).

Figure 5:
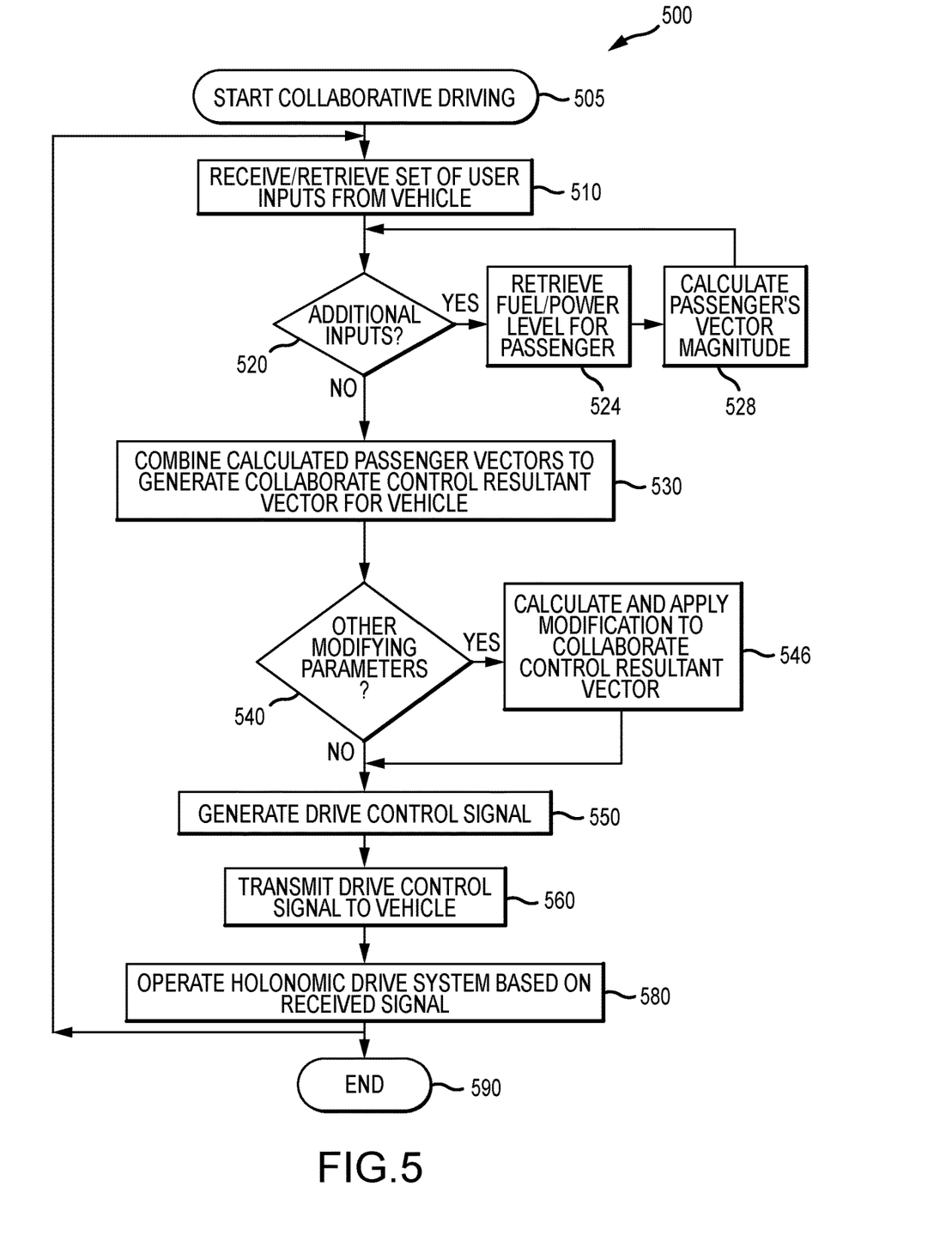
FIG. 5 is a flow diagram of a collaborative driving or control method as may be performed by the attraction or game control module (and an algorithm(s) carried out by executing its underlying code/instructions).

FIG. 5 illustrates a flow diagram or algorithm of a collaborative control or driving method performed by the control module of the present description (e.g., by the processor 132 when running or executing the code/instructions provided by software module 134). The method 500 starts at 505 such as with providing one-to-many vehicles equipped with holonomic drive systems and with user input assemblies/devices for each passenger in a ride or drive space of a ride or attraction of an amusement or theme park or other entertainment facility. Further, step 505 may involve providing a system controller with an attraction or game control module (such as module 134 of system 100 of FIG. 1) for the ride or drive space, with the system controller configured for wireless communication with the drive system controller of each of the holonomic vehicles. Further, step 505 may involve providing motion sensors for determining current locations of each of the vehicles in the drive space. Also, game systems such as projection systems may be provided for projecting virtual game play objects and obstacles on the surface/floor of the ride space for the vehicles to collect and avoid, respectively, during game play with the holonomic vehicles.

The method 500 continues at 510 with the system controller receiving (or retrieving via vehicle polling) a set of user inputs from a vehicle (note, steps 510-580 of method 500 are performed concurrently for all holonomic vehicles in a particular park ride/attraction). As discussed above, this may involve identifying a state of each passenger's drive control element, which may be a button or take another form, and, in some embodiments, the "state" is either on or off while other embodiments may allow for the passenger to input a state between full thrust (or fully on) and no thrust (or fully off).

At step 520, the system controller acts to determine whether input from all passenger input assemblies has been processed. If not, the method 500 continues at 524 with retrieving the next passenger's fuel/power level (as well as their assigned thrust or other vector direction). At 528, the current passenger's vector magnitude is calculated such as by multiplying the fuel/power percentage by an acceleration (or velocity) parameter currently set for the vehicle. The magnitude is combined with the direction of the vector to fully define the current passenger's drive/control vector. The method 500 then continues until all the passenger's drive/control vectors have been calculated. The method 500 continues at 530 with combining all the calculated passenger vectors to generate a collaborative resultant vector for the vehicle. For example, this vector, as discussed with regard to FIG. 4, may define a magnitude of acceleration along with a direction of travel for the vehicle.

The method 500 then continues at 540 with determining whether or not there are any other modifying parameters present (or are assigned by the control module's algorithm/software) that need to be applied prior to issuing a drive control signal. If yes, the method 500 continues at 546 with calculating (or retrieving in some cases) and applying the modification to the vector from step 530. Numerous modifying parameters may be used to perform the collaborative drive method 500 such as whether or not the vehicle is determined to have an imminent collision with another vehicle or another obstacle that needs to be prevented (and converted into a virtual collision as discussed in detail above), such as whether the vehicle has collected and/or otherwise been assigned or attributed with game play data/values that modify operation of the vehicle (such as by modifying its acceleration parameter, by changing its direction of travel, by causing it to spin, by causing it to vibrate, or the like), and such as whether there are vehicle operating parameters/constraints that limit control by the passengers.

The method 500 continues at 550 with generating a drive control signal based on the vector from step 530 or from step 546. At step 560, the system controller operates to wirelessly transmit the drive control signal to the vehicle that provided the user inputs of step 510. The method 500 then continues at 580 with the vehicle's onboard controller operating the vehicle's holonomic drive system based on the input signal to move in the direction defined by the vector from the steps 530 or 546 and at the speed or at the acceleration defined by this same vector. The method 500 may then end at 590 or continue (such as within a second or the like) with step 510. Note, there may or may not be a difference in process structure between the additional input step 520 and other modifying parameters step 540. The sub-loop may either process one entity at a time or all entities together. Typically, both sub-loops, though, would handle multiple entities in the same manner.

Although the invention has been described and illustrated with a certain degree of particularity, the particular implementations described in the present disclosure have been as examples, and numerous changes in the combination and arrangement of parts can be resorted to by those skilled in the art without departing from the spirit and scope of the invention, as claimed.

As described above, systems and methods are taught that allow two or more passengers (e.g., three to eight or the like) to collaborate to impart 2D travel to the vehicle they are sharing. A virtual thruster is associated with each of the passengers (or with their user input assembly or their seat), and each passenger provides user input via a user input assembly near to their seat that indicates whether or not they want their thruster to be operating at the present time (or operating state of the vehicle). Typically, the direction of travel provided to the vehicle by each virtual thruster is fixed but some embodiments use a joystick or other drive control element in the user input assembly to allow the passenger to also set direction rather than simply turning the thruster on and off.

The magnitude to the thrust (set as an acceleration value or as a velocity value) generally starts at some predefined maximum value as each passenger is also assigned a fuel or power level that is full or maximum (and the magnitude of the control vector is adjusted by the value of the fuel/power level). Typically, the fuel/power level for each user is decreased over time and then recharged when no thrusting is requested by the passenger. For example, the passenger may use/burn fuel by holding down or activating their drive control element (e.g., pressing a thrust button) and then be refueled by releasing or deactivating their drive control element. In one example, each passenger has a fixed amount of fuel/power that will be used up in a predefined time period and will then be recharged/refueled in the same predefined time period (or one that is shorter or longer).

In the embodiments shown, the virtual thruster provided to each passenger provided linear acceleration (or velocity) in the direction the passenger is facing when seated in one of the vehicle's passenger seats. This may be inward as shown in some of the figures or it may be in another direction such as by having all seats oriented to have the passengers face outward. In some embodiments, the fixed (or modifiable) vector direction does not match the direction the passenger is facing or does not match for all of the passengers such as for a vehicle in which all passengers face a single direction in which some vector directions would need to differ to allow collaborative control to provide 2D travel through a space.

In some embodiments, in addition to or in place of collaborative control, the control over the vehicle may sequentially pass between individual drivers or between sets of drivers. For example, turn-based driving may be provided by a system controller. In such embodiments, the vehicle may follow a linear path with one driver providing the thrusting but then pass to an adjacent passenger when the vehicle strikes or virtually collides with a real or virtual object in the driving space. In such embodiments, the system controller may spin the vehicle on its vertical center axis to cause the passenger that is now in control to face forward or backwards (so they are facing the direction of travel provided by their virtual thruster or are facing the direction that flames or the like are output from their thruster/drive).

Figure 3D:
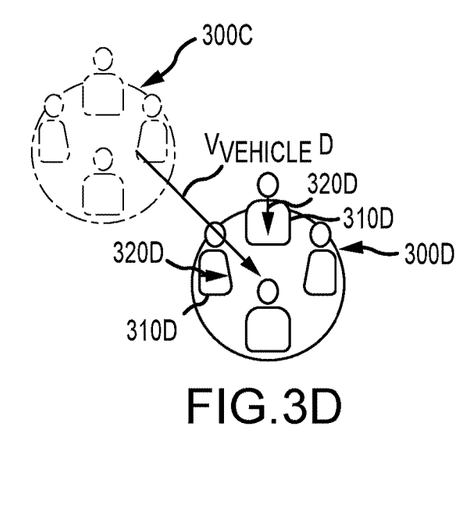

The examples of FIGS. 2-3D illustrate four passengers, but, as discussed with reference to FIG. 1, the collaborative control may be shared among fewer passengers or a greater number of passengers such as 5 to 8 or more. In one tested embodiment, the inventors used a holonomic vehicle adapted to have eight passengers, and the passengers were divided into groups of two. Each passenger was provided their own input devices (e.g., a button to press or the like), and each pair of passengers (or each group of two) faced down one of the cardinal axes. In another embodiment, passengers are not grouped or paired with each input processed separately. In other cases, the passengers are positioned at differing angular offsets (rather than 90 degree offsets). For example, eight passengers may be provided in a holonomic vehicle with each separated by 45 degrees, and each is allowed to provide control one of the eight axes of motion with their "thruster."

We claim:
1. A system for use in a park attraction that provides a collaborative driving experience, comprising:
  a vehicle including a body with a plurality of passenger seats, including a user input assembly proximate to each of the passenger seats, and further including a holonomic drive system adapted to move the body in any direction while riding on a driving surface of the park attraction; and
  a system controller operating to:
    receive user input from each of the user input assemblies;
    process the user input from each of the user input assemblies to generate a control vector associated with each of the user input assemblies;
    combine the control vectors from all of the user input assemblies to generate a resultant vector;
    generate a drive control signal from the resultant vector; and
    transmit the drive control signal to the vehicle,
  wherein the holonomic drive system operates in response to the drive control signal to move on the driving surface of the park attraction.

2. The system of claim 1, wherein the control vectors each define a direction of travel on the driving surface and a magnitude of acceleration.

3. The system of claim 2, wherein the body includes four of the passenger seats and wherein the direction of travel for a pair of adjacent ones of the user input assemblies are offset at an angular offset of 90 degrees.

4. The system of claim 3, wherein the passenger seats have seat backs oriented such that a passenger seated in any of the passenger seats faces inward toward a vertical center axis of the body of the vehicle.

5. The system of claim 4, wherein the direction of travel for each of the control vectors is orthogonal to a vertical plane extending through one of the seat backs and extends inward toward the vertical center axis of the body of the vehicle, whereby the direction of travel is in a direction corresponding to a direction a passenger in one of the passenger seats is facing.

6. The system of claim 2, wherein a fuel or power level value is assigned to each of the user assemblies and wherein the processing of the user input from each of the user input assemblies comprises multiplying the magnitude of acceleration by the fuel or power level value.

7. The system of claim 1, wherein the control vectors are combined by the system controller using a 2D vector summation.

8. The system of claim 1, wherein each of the user input assemblies includes a drive control element that is operable by a passenger of the vehicle to be in a first operating state and in a second operating state and wherein the user input provided when the drive control element is in the first operating state corresponds with full thrust by a virtual thruster or drive associated with and operable by the passenger to move the vehicle in a direction matching a direction in which the passenger is presently facing in one of the passenger seats.

9. The system of claim 1, wherein the system controller, before generating the drive control signal, modifies the resultant vector based upon operating parameters of the vehicle, based upon game play data for the park attraction, or based on detection of an upcoming collision with an obstacle or other vehicle.

10. The system of claim 1, wherein the holonomic drive system comprises an omni wheel-based drive.

11. The system of claim 1, wherein the vehicle comprises four to eight of the passenger seats.

12. The system of claim 11, wherein the vehicle includes eight of the passenger seats and wherein the system controller processes the user input from four predefined pairs of the user input assemblies to generate the resultant vector when the four predefined pairs each faces inward along one of the cardinal axes or each of the passenger seats faces inward along axes offset by 45 degrees.

13. A system for use in a park attraction that provides a collaborative driving experience, comprising:
   a vehicle including a body with a plurality of passenger seats, including a user input assembly proximate to each of the passenger seats, and further including a holonomic drive system adapted to move the body in any direction while riding on a driving surface of the park attraction; and
   a system controller running a control module that:
      processes user input from each of the user input assemblies to generate a control vector for each of the user input assemblies;
      combines the control vectors from the user input assemblies to generate a resultant vector;
      generates a drive control signal from the resultant vector; and
      transmits the drive control signal to the vehicle to operate the holonomic drive,
   wherein the system controller, before generating the drive control signal, modifies the resultant vector based upon operating parameters of the vehicle, based upon game play data for the park attraction, or based on detection of an upcoming collision with an obstacle or other vehicle.

14. The system of claim 13, wherein the control vectors each define a direction of travel on the driving surface and a magnitude of acceleration or velocity.

15. The system of claim 13, wherein the body includes four of the passenger seats, wherein the direction of travel for a pair of adjacent ones of the user input assemblies are offset at an angular offset of 90 degrees, and wherein the passenger seats have seat backs oriented such that a passenger seated in any of the passenger seats faces inward toward a vertical center axis of the body of the vehicle.

16. The system of claim 14, wherein a fuel or power level value is assigned to each of the user assemblies and wherein the processing of the user input from each of the user input assemblies comprises multiplying the magnitude of acceleration or velocity by the fuel or power level value.

17. The system of claim 13, wherein the control vectors are combined by the system controller using a 2D vector summation.

18. A system for use in a park attraction that provides a collaborative driving experience, comprising:
   a vehicle including a body including a plurality of user input assemblies and a drive system adapted to move the body about the park attraction; and
   a system controller operating to:
      receive user input from each of the user input assemblies;
      process the user input from each of the user input assemblies to generate a drive control signal; and
      transmit the drive control signal to the vehicle,
   wherein the drive system operates in response to the drive control signal to travel within the park attraction,
   wherein a fuel or power level value is assigned to each of the user assemblies, and
   wherein the processing of the user input from each of the user input assemblies comprises multiplying a predefined magnitude of acceleration or velocity by the fuel or power level value.

19. The system of claim 18, wherein the plurality of user input assemblies are each operable to initiate acceleration or velocity at a magnitude along a different direction of travel for the vehicle.

20. The system of claim 19, wherein the body includes a passenger seat facing and proximate to each of the user input assemblies and wherein the direction of travel associated with each of the user input assemblies corresponds to a direction a corresponding one of the passenger seats is facing in the vehicle.

21. A system for use in a park attraction that provides a collaborative driving experience, comprising:
   a vehicle including a body with a plurality of passenger seats, including a user input assembly proximate to each of the passenger seats, and further including a holonomic drive system adapted to move the body in any direction while riding on a driving surface of the park attraction; and
   a system controller operating to:
      receive user input from each of the user input assemblies;
      process the user input from each of the user input assemblies to generate a control vector associated with each of the user input assemblies;
      combine the control vectors from all of the user input assemblies to generate a resultant vector;
      generate a drive control signal from the resultant vector; and
      transmit the drive control signal to the vehicle,
   wherein the holonomic drive system operates in response to the drive control signal to move on the driving surface of the park attraction,
   wherein the control vectors each define a direction of travel on the driving surface and a magnitude of acceleration,
   wherein a fuel or power level value is assigned to each of the user assemblies,
   wherein the processing of the user input from each of the user input assemblies comprises multiplying the magnitude of acceleration by the fuel or power level value, and
   wherein the fuel or power level value is decreased based on length of time in which a corresponding one of the user input assemblies is operated to provide input and is increased based on length of time in which the corresponding one of the user input assemblies is not operated.

22. A system for use in a park attraction that provides a collaborative driving experience, comprising:
   a vehicle including a body with a plurality of passenger seats, including a user input assembly proximate to each of the passenger seats, and further including a holonomic drive system adapted to move the body in any direction while riding on a driving surface of the park attraction; and
   a system controller operating to:
      receive user input from each of the user input assemblies;
      process the user input from each of the user input assemblies to generate a control vector associated with each of the user input assemblies;
      combine the control vectors from all of the user input assemblies to generate a resultant vector;
      generate a drive control signal from the resultant vector; and
      transmit the drive control signal to the vehicle, wherein the holonomic drive system operates in response to the drive control signal to move on the driving surface of the park attraction, wherein the control vectors each define a direction of travel on the driving surface and a magnitude of acceleration, wherein a fuel or power level value is assigned to each of the user assemblies, wherein the processing of the user input from each of the user input assemblies comprises multiplying the magnitude of acceleration by the fuel or power level value, and wherein the fuel or power level is increased when the system control detects that the vehicle has made virtual contact with or passed over a virtual fuel or power up object or senses the vehicle has touched a physical fuel or power up object.

23. A system for use in a park attraction that provides a collaborative driving experience, comprising:

a vehicle including a body with a plurality of passenger seats, including a user input assembly proximate to each of the passenger seats, and further including a holonomic drive system adapted to move the body in any direction while riding on a driving surface of the park attraction; and a system controller running a control module that:

processes user input from each of the user input assemblies to generate a control vector for each of the user input assemblies;

combines the control vectors from the user input assemblies to generate a resultant vector;

generates a drive control signal from the resultant vector; and transmits the drive control signal to the vehicle to operate the holonomic drive, wherein the system controller, before generating the drive control signal, modifies the resultant vector based upon operating parameters of the vehicle, based upon game play data for the park attraction, or based on detection of an upcoming collision with an obstacle or other vehicle, wherein the control vectors each define a direction of travel on the driving surface and a magnitude of acceleration or velocity, wherein a fuel or power level value is assigned to each of the user assemblies, wherein the processing of the user input from each of the user input assemblies comprises multiplying the magnitude of acceleration or velocity by the fuel or power level value, and wherein the fuel or power level value is decreased based on length of time in which a corresponding one of the user input assemblies is operated to provide input and is increased based on length of time in which the corresponding one of the user input assemblies is not operated.

* * * * *